United States Patent
Li et al.

(10) Patent No.: US 12,170,382 B2
(45) Date of Patent: Dec. 17, 2024

(54) BATTERY, POWER CONSUMPTION APPARATUS, METHOD AND APPARATUS FOR PRODUCING BATTERY

(71) Applicant: CONTEMPORARY AMPEREX TECHNOLOGY (HONG KONG) LIMITED, Hong Kong (CN)

(72) Inventors: Xianda Li, Ningde (CN); Xiaobo Chen, Ningde (CN); Yao Li, Ningde (CN); Mingguang Gu, Ningde (CN); Piaopiao Yang, Ningde (CN); Lu Hu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 425 days.

(21) Appl. No.: 17/563,364

(22) Filed: Dec. 28, 2021

(65) Prior Publication Data

US 2022/0311084 A1 Sep. 29, 2022

Related U.S. Application Data

(63) Continuation of application No. PCT/CN2021/082478, filed on Mar. 23, 2021.

(51) Int. Cl.
*H01M 50/325* (2021.01)
*H01M 10/0525* (2010.01)
*H01M 10/613* (2014.01)
*H01M 10/625* (2014.01)
*H01M 10/656* (2014.01)

(52) U.S. Cl.
CPC ....... *H01M 50/325* (2021.01); *H01M 10/613* (2015.04); *H01M 10/625* (2015.04); *H01M 2200/10* (2013.01); *H01M 2200/20* (2013.01); *H01M 2220/20* (2013.01)

(58) Field of Classification Search
CPC ............ H01M 50/325; H01M 10/613; H01M 10/625; H01M 2200/10; H01M 2200/20; H01M 2220/20; H01M 10/6556; H01M 50/308; H01M 50/3425; H01M 50/358; H01M 50/375; H01M 50/392; H01M 50/209; H01M 10/60; H01M 10/656; H01M 50/24; H01M 50/317; H01M 10/052; Y02E 60/10
See application file for complete search history.

(56) References Cited

U.S. PATENT DOCUMENTS

| | | | | |
|---|---|---|---|---|
| 5,357,185 A | * | 10/1994 | Chen | ...... H02J 7/0045 320/110 |
| 2012/0107663 A1 | | 5/2012 | Burgers et al. | |
| 2021/0328281 A1 | | 10/2021 | Chu et al. | |
| 2023/0327257 A1 | * | 10/2023 | Ishitobi | ...... B60L 50/66 429/120 |

FOREIGN PATENT DOCUMENTS

| | | | | |
|---|---|---|---|---|
| CN | 211428236 U | 9/2020 | | |
| CN | 112018321 A | 12/2020 | | |
| CN | 112018462 A | 12/2020 | | |
| CN | 112086604 A | 12/2020 | | |
| CN | 112086605 A | 12/2020 | | |
| EP | 3890057 A1 | 10/2021 | | |
| JP | 2009534811 A | 9/2009 | | |
| JP | 2016100308 A | 5/2016 | | |
| JP | 2017147128 A | 8/2017 | | |
| JP | 2017157508 A | 9/2017 | | |
| JP | 2019129149 A | 8/2019 | | |
| KR | 101853908 B1 | 5/2018 | | |
| WO | WO-2020133659 A1 | * | 7/2020 | ............ H01M 10/52 |

OTHER PUBLICATIONS

Notification to Grant Patent Right for Invention dated Sep. 20, 2023 received in Chinese Patent Application No. CN 202180001113.1.
Decision to Grant a Patent dated Dec. 25, 2023 received in Japanese Patent Application No. JP 2022-568464.
Extended European Search report dated May 24, 2022 received in European Patent Application No. EP 21755672.9.

* cited by examiner

*Primary Examiner* — Muhammad S Siddiquee
(74) *Attorney, Agent, or Firm* — Scully, Scott, Murphy & Presser, P.C.

(57) ABSTRACT

Embodiments of the present application provide a battery, a power consumption apparatus, a method and apparatus for producing a battery. The battery includes: a battery cell including a pressure relief mechanism disposed on a first wall; and a thermal management component, a first surface of the thermal management component being attached to the first wall, and the thermal management component being provided with a pressure relief zone; where the first wall is provided with a first restraint member, the thermal management component is provided with a second restraint member, and the first restraint member and the second restraint member are arranged to be mated, so that the pressure relief mechanism is arranged opposite to the pressure relief zone. A battery, a power consumption apparatus, a method and apparatus for producing a battery of the present application could enhance safety of the battery.

18 Claims, 5 Drawing Sheets

BATTERY, POWER CONSUMPTION APPARATUS, METHOD AND APPARATUS FOR PRODUCING BATTERY

CROSS-REFERENCE TO RELATED APPLICATIONS

This application is a continuation of International Application No. PCT/CN2021/082478, filed on Mar. 23, 2021, the disclosure of which is hereby incorporated by reference in its entirety.

TECHNICAL FIELD

The present application relates to the field of battery technologies, and in particular, to a battery, a power consumption apparatus, a method and apparatus for producing a battery.

BACKGROUND

Energy conservation and emission reduction are the key to the sustainable development of the automotive industry. In this case, electric vehicles have become an important part of the sustainable development of the automotive industry due to their advantages of energy conservation and environmental protection. For the electric vehicles, the battery technology is an important factor for their development.

In the development of the battery technology, in addition to improving performance of batteries, safety is also an issue that cannot be ignored. If the safety of the batteries cannot be ensured, the batteries cannot be used. Therefore, how to enhance the safety of the batteries is an urgent technical problem to be solved in the battery technology.

SUMMARY

The present application provides a battery, a power consumption apparatus, a method and apparatus for producing a battery, which could enhance safety of the battery.

In a first aspect, a battery is provided, including: a battery cell including a pressure relief mechanism, the pressure relief mechanism being disposed on a first wall of the battery cell, and the pressure relief mechanism being configured to be actuated when an internal pressure or temperature of the battery cell reaches a threshold, to relieve the internal pressure; and a thermal management component configured to accommodate a fluid to adjust a temperature of the battery cell, a first surface of the thermal management component being attached to the first wall, and the thermal management component being provided with a pressure relief zone, so that emissions discharged from an inside of the battery cell are capable of being discharged through the pressure relief zone when the pressure relief mechanism is actuated; where the first wall is provided with a first restraint member, the thermal management component is provided with a second restraint member, and the first restraint member and the second restraint member are arranged to be mated, so that the pressure relief mechanism is arranged opposite to the pressure relief zone.

Therefore, according to a battery of an embodiment of the present application, a first restraint member is disposed on a first wall where a pressure relief mechanism of a battery cell is located, and a second restraint member is disposed on a thermal management component. In this way, opposite arrangement of the pressure relief mechanism and a pressure relief zone could be accurately achieved through mating arrangement of the first restraint member and the second restraint member, which is convenient for alignment installation of the pressure relief mechanism and the pressure relief zone, so that emissions discharged from the battery cell are capable of being discharged smoothly through the pressure relief zone when the pressure relief mechanism is actuated, and explosion of the battery cell is effectively avoided.

In some embodiments, the first restraint member includes a protrusion structure and the second restraint member includes a groove structure, or the first restraint member includes a groove structure and the second restraint member includes a protrusion structure; and the protrusion structure is at least partially accommodated in the groove structure.

The mating arrangement of the first restraint member and the second restraint member is achieved through a groove structure and a protrusion structure, which is convenient for processing, and could facilitate installation and fixation of the pressure relief mechanism and the pressure relief zone.

In some embodiments, a gap is provided between the pressure relief mechanism and the first surface, and the gap is configured to provide a deformation space for the pressure relief mechanism, so that the pressure relief mechanism deforms toward the thermal management component, and further the emissions discharged from the inside of the battery cell are capable of being discharged quickly and smoothly through the pressure relief mechanism.

In some embodiments, a height of the protrusion structure is greater than a depth of the groove structure, so that there is a gap between the pressure relief mechanism and the first surface.

In some embodiments, the second restraint member includes the groove structure, the second restraint member includes a first protrusion and a second protrusion in sequence around the pressure relief zone in a direction outward from a center of the pressure relief zone, and the groove structure is formed between the first protrusion and the second protrusion.

In some embodiments, the first restraint member includes the groove structure, the first restraint member includes a third protrusion and a fourth protrusion in sequence around the pressure relief mechanism in a direction outward from a center of the pressure relief mechanism, and the groove structure is formed between the third protrusion and the fourth protrusion.

Whether the first restraint member or the second restraint member includes a groove structure, the groove structure is formed by providing two protrusions, so that the first restraint member could protrude from a surface of the first wall relative to the pressure relief mechanism, while the second restraint member also protrudes from the first surface of the thermal management component. In this way, when the first restraint member is arranged to be mated with the second restraint member, not only accurate alignment of the pressure relief mechanism and the pressure relief zone can be achieved, installation efficiency is improved, but also a gap is provided between the pressure relief mechanism and the first surface, which could provide a deformation space for the pressure relief mechanism 213 when it is actuated.

In some embodiments, two first restraint members are disposed around the pressure relief mechanism, and one of the two first restraint members overlaps with the other first restraint member after rotating 180° about a central point of the pressure relief mechanism on the first wall.

In some embodiments, two second restraint members are disposed around the pressure relief zone, and one of the two second restraint members overlaps with the other second restraint member after rotating 180° about a central point of the pressure relief zone on the first surface.

In some embodiments, the first restraint member is an annular structure surrounding a periphery of the pressure relief mechanism.

In some embodiments, the second restraint member is an annular structure surrounding a periphery of the pressure relief zone.

By evenly and symmetrically arranging the first restraint member and the second restraint member, processing and installation processes can be simplified, so that the first restraint member and the second restraint member are more stable after being installed, and are not easy to be shifted.

In some embodiments, an area of the pressure relief zone is larger than or equal to an area of the pressure relief mechanism.

In some embodiments, the pressure relief zone is a through hole, so that the emissions discharged from the battery cell are capable of being discharged more quickly through the pressure relief zone.

In some embodiments, the thermal management component includes a groove arranged opposite to the pressure relief mechanism, a bottom wall of the groove forms the pressure relief zone, and a thickness of the thermal management component at the bottom wall of the groove is smaller than a thickness of the thermal management component at another region other than the groove.

In some embodiments, a melting point of a material of the pressure relief zone is smaller than a melting point of a material of another region on the thermal management component other than the pressure relief zone.

The pressure relief zone is not provided by way of a through hole, when the pressure relief mechanism is not actuated, the thermal management component keeps an electrical chamber and a collection chamber relatively isolated, which could avoid substances in the collection chamber to enter the electrical chamber, thereby protecting the battery cell in the electrical chamber.

In a second aspect, a power consumption device is provided, including: the battery of the first aspect configured to provide electric energy.

In some embodiments, the power consumption device is a vehicle, a ship or a spacecraft.

In a third aspect, a method for producing a battery is provided, including: providing a battery cell, the battery cell including a pressure relief mechanism, the pressure relief mechanism being disposed on a first wall of the battery cell, and the pressure relief mechanism being configured to be actuated when an internal pressure or temperature of the battery cell reaches a threshold, to relieve the internal pressure; and providing a thermal management component, the thermal management component being configured to accommodate a fluid to adjust a temperature of the battery cell, a first surface of the thermal management component being attached to the first wall, and the thermal management component being provided with a pressure relief zone, so that emissions discharged from an inside of the battery cell are capable of being discharged through the pressure relief zone when the pressure relief mechanism is actuated; where the first wall is provided with a first restraint member, the thermal management component is provided with a second restraint member, and the first restraint member and the second restraint member are arranged to be mated, so that the pressure relief mechanism is arranged opposite to the pressure relief zone.

In a fourth aspect, an apparatus for producing a battery is provided, including a module for carrying out the method of the third aspect described above.

Figure 1:
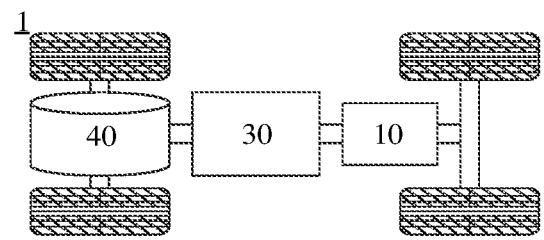
FIG. 1 is a schematic structural diagram of a vehicle disclosed in an embodiment of present application.

In the accompanying drawings, the accompanying drawings are not drawn to actual scale.

DESCRIPTION OF EMBODIMENTS

Implementation manners of the present application will be further described below in detail with reference to the accompanying drawings and embodiments. The detailed description of the following embodiments and the accompanying drawings are used to exemplarily illustrate principles of the present application, but cannot be used to limit the scope of the present application, that is, the present application is not limited to the described embodiments.

In the description of the present application, it should be noted that, unless otherwise illustrated, "a plurality of" means more than two (including two); and orientations or positional relationships indicated by terms such as "up", "down", "left", "right", "inside", and "outside" are merely for convenience of describing the present application and for simplifying the description, rather than for indicating or implying that an indicated apparatus or element must have a specific orientation, and must be constructed and operated in a specific orientation, which thus shall not be understood as limitation to the present application. In addition, the terms such as "first", "second", and "third" are merely intended for the purpose of description, and shall not be understood as an indication or implication of relative importance. "Vertical" is not strictly vertical, but within an allowable range of error. "Parallel" is not strictly parallel, but within an allowable range of error.

The terms representing directions in the following description are all directions shown in the drawings, and do not limit the specific structure of the present application. In the description of the present application, it should be further noted that, unless explicitly specified and defined otherwise, terms "installation", "interconnection", "connection" and "attachment" should be understood broadly, for example, they may either be a fixed connection, or a detachable connection, or an integrated connection; and they may either be a direct connection, or an indirect connection through an intermediary. Those of ordinary skill in the art may understand the specific meanings of the foregoing terms in the present application according to specific conditions.

In the present application, a battery cell may include a primary battery, a secondary battery, such as a lithium-ion battery, a lithium-sulfur battery, a sodium lithium-ion battery, a sodium-ion battery or a magnesium-ion battery, which is not limited in the embodiments of the present application. The battery cell may be cylindrical, flat, cuboid or in another shape, which is also not limited in the embodiments of the present application. A battery cell is generally divided into three types according to the way of packaging: a cylindrical battery cell, a prismatic battery cell and a pouch battery cell, which is also not limited in the embodiments of the present application.

The battery mentioned in the embodiments of the present application refers to a single physical module including one or more battery cells to provide a higher voltage and capacity. For example, the battery mentioned in the present application may include a battery module, a battery pack, or the like. The battery pack generally includes a box for packaging one or more battery cells. The box can avoid liquid or other foreign matters to affect charging or discharging of the battery cell.

The battery cell includes an electrode assembly and an electrolytic solution, and the electrode assembly includes a positive electrode sheet, a negative electrode sheet and a separator. The operation of the battery cell mainly relies on movement of metal ions between the positive electrode sheet and the negative electrode sheet. The positive electrode sheet includes a positive electrode current collector and a positive electrode active material layer. The positive electrode active material layer is coated on a surface of the positive electrode current collector, the current collector not coated with the positive electrode active material layer protrudes from the current collector coated with the positive electrode active material layer, and the current collector not coated with the positive electrode active material layer serves as a positive tab. In an example of a lithium-ion battery, a material of the positive electrode current collector may be aluminum, and a positive electrode active material may be lithium cobalt oxides, lithium iron phosphate, ternary lithium, lithium manganate, or the like. The negative electrode sheet includes a negative electrode current collector and a negative electrode active material layer. The negative electrode active material layer is coated on a surface of the negative electrode current collector, the current collector not coated with the negative electrode active material layer protrudes from the current collector coated with the negative electrode active material layer, and the current collector not coated with the negative electrode active material layer serves as a negative tab. A material of the negative electrode current collector may be copper, and a negative electrode active material may be carbon, silicon, or the like. In order to ensure that no fusing occurs when a large current passes, there are a plurality of positive tabs which are stacked together, and there are a plurality of negative tabs which are stacked together. A material of the separator may be PP, PE, or the like. In addition, the electrode assembly may be a winding structure or a laminated structure, and the embodiments of the present application are not limited thereto. With the development of the battery technology, it is necessary to consider design factors in multiple aspects simultaneously, such as energy density, cycle life, discharge capacity, C-rate and other performance parameters. In addition, safety of the battery should also be considered.

For a battery, a main safety hazard comes from charging and discharging processes, and in order to improve safety performance of the battery, a battery cell is generally provided with a pressure relief mechanism. The pressure relief mechanism refers to an element or component that is actuated when an internal pressure or temperature of the battery cell reaches a predetermined threshold, to relieve the internal pressure or temperature. The predetermined threshold may be adjusted according to different design demands. The predetermined threshold may depend on a material of one or more of a positive electrode sheet, a negative electrode sheet, an electrolytic solution and a separator in the battery cell. The pressure relief mechanism may adopt, for example, a pressure-sensitive or temperature-sensitive element or component. That is, when the internal pressure or temperature of the battery cell reaches the predetermined threshold, the pressure relief mechanism is actuated, so as to form a channel for relieving the internal pressure or temperature.

The "actuation" mentioned in the present application means that the pressure relief mechanism acts, so that the internal pressure and temperature of the battery cell can be relieved. The action generated by the pressure relief mechanism may include but be not limited to: at least a part of the pressure relief mechanism being fractured, torn or melted, and so on. After the pressure relief mechanism is actuated, high-temperature and high-pressure substances inside the battery cell are discharged outward from the pressure relief mechanism as emissions. In this way, the pressure of the battery cell can be relieved at a controllable pressure or temperature, thereby avoiding potentially more serious accidents.

The emissions from the battery cell mentioned in the present application include but are not limited to: an electrolytic solution, dissolved or split positive and negative electrode sheets, fragments of a separator, high-temperature and high-pressure gas generated by reaction, flame, or the like.

The pressure relief mechanism on the battery cell has an important impact on the safety of the battery. For example, when short circuit, overcharge and other phenomena occur in the battery cell, it may lead to thermal runaway inside the battery cell, resulting in a sudden increase in pressure or temperature. In this case, the internal pressure and temperature can be released outward through the actuation of the pressure relief mechanism, to prevent the battery cell from exploding and catching fire.

In the current design solutions of the pressure relief mechanism, the main concern is to release the high pressure and high heat inside the battery cell, that is, the emissions are discharged to an outside of the battery cell. However, in order to ensure an output voltage or current of the battery, a plurality of battery cells are often required and electrically connected to each other via a bus component. Emissions discharged from an inside of a battery cell may cause short circuit of the other battery cells. For example, when discharged metal scraps electrically connect two bus components, the battery is short-circuited, thereby posing a potential safety hazard. Moreover, the high-temperature and high-pressure emissions are discharged in a direction in which a pressure relief mechanism of the battery cell is provided, and more specifically, may be discharged in a direction of a region where the pressure relief mechanism is actuated. The strength and destructive power of such emissions may be great, or may even be enough to break through one or more structures in this direction, causing further safety problems.

In view of this, according to the embodiments of the present application, an inside of a box of a battery is separated by a thermal management component into an electrical chamber for accommodating battery cells and a collection chamber for collecting emissions. When a pressure relief mechanism is actuated, the emissions from the battery cells enter the collection chamber, and do not enter the electrical chamber or enter the electrical chamber in a small amount, thereby reducing the impact of the emissions on a bus component in the electrical chamber, and safety of the battery could be enhanced. In addition, since the emissions from the battery cells are collected via the collection chamber, the high-temperature and high-pressure emissions are buffered and the pressure and temperature of the emissions are reduced. This reduces the destructive power of the emissions to other structures, thereby further enhancing the safety of the battery.

The thermal management component is configured to accommodate a fluid to adjust the temperature of a plurality of battery cells. The fluid here may be liquid or gas, and the temperature adjustment means heating or cooling the plurality of battery cells. In a case of cooling or lowering the temperature of the battery cells, the thermal management component is configured to accommodate a cooling fluid to lower the temperature of the plurality of battery cells. In this case, the thermal management component may also be called a cooling component, a cooling system, a cooling plate, or the like. The fluid accommodated in it may also be called a cooling medium or a cooling fluid, and more specifically, may be called a cooling liquid or a cooling gas. In addition, the thermal management component may also be configured for heating to raise the temperature of the plurality of battery cells, which is not limited in the embodiments of the present application. Optionally, the fluid may flow in a circulating manner to achieve a better temperature adjustment effect. Optionally, the fluid may be water, a mixture of water and ethylene glycol, air, or the like.

The electrical chamber is configured to accommodate the plurality of battery cells and the bus component. The electrical chamber may be sealed or unsealed. The electrical chamber provides an installation space for the battery cells and the bus component. In some embodiments, a structure configured to fix the battery cells may also be disposed in the electrical chamber. A shape of the electrical chamber may be determined according to the plurality of battery cells and the bus component which are accommodated therein. In some embodiments, the electrical chamber may be a cube with six walls. Since the battery cells in the electrical chamber are electrically connected to form higher voltage output, the electrical chamber may also be called a "high-voltage chamber".

The bus component is configured to implement the electrical connection between the plurality of battery cells, such as parallel connection, series connection or series-parallel connection. The bus component may implement the electrical connection between the battery cells by connecting electrode terminals of the battery cells. In some embodiments, the bus component may be fixed to the electrode terminals of the battery cells by means of welding. Corresponding to the "high-voltage chamber", the electrical connection formed by the bus component may also be called "high-voltage connection".

The collection chamber is configured to collect emissions, and may be sealed or unsealed. In some embodiments, the collection chamber may contain air or another gas. In the collection chamber there is no electrical connection to the voltage output. Corresponding to the "high-voltage chamber", the collection chamber may also be called a "low-voltage chamber". Optionally, or additionally, the collection chamber may also contain a liquid, such as a cooling medium, or a component for accommodating the liquid is provided therein to further lower the temperature of the emissions entering the collection chamber. Further, optionally, the gas or liquid in the collection chamber flows in a circulating manner.

The technical solutions described in the embodiments of the present application are all applicable to various apparatuses using batteries, such as mobile phones, portable devices, notebook computers, electromobiles, electric toys, electric tools, electric vehicles, ships and spacecrafts. For example, the spacecrafts include airplanes, rockets, space shuttles, spaceships, and the like.

It should be understood that the technical solutions described in the embodiments of the present application are not only applicable to the devices described above, but also applicable to all devices using batteries. However, for brief description, the following embodiments are all described by an example of an electric vehicle.

For example, as shown in FIG. 1, FIG. 1 is a schematic structural diagram of a vehicle 1 according to an embodiment of the present application. The vehicle 1 may be a fuel-powered vehicle, a gas-powered vehicle or a new energy vehicle, and the new energy vehicle may be a battery electric vehicle, a hybrid vehicle, an extended-range vehicle, or the like. The vehicle 1 may be internally provided with a motor 40, a controller 30 and a battery 10, and the controller 30 is configured to control the battery 10 to supply power to the motor 40. For example, the battery 10 may be disposed at the bottom, head or tail of the vehicle 1. The battery 10 may be used for power supply to the vehicle 1. For example, the battery 10 may serve as an operation power source of the vehicle 1 for a circuit system of the vehicle 1, for example, for a working power demand of the vehicle 1 during startup, navigation and running. In another embodiment of the present application, the battery 10 may serve not only as an operation power source of the vehicle 1, but also as a driving power source of the vehicle 1, replacing or partially replacing fuel or natural gas to provide driving power for the vehicle 1.

In order to meet different power demands, the battery 10 may include a plurality of battery cells, where the plurality of battery cells may be in series connection, parallel connection or series-parallel connection. The series-parallel connection refers to a combination of series connection and parallel connection. The battery may also be referred to as a battery pack. Optionally, the plurality of battery cells may be first connected in series, in parallel or in series and parallel to constitute a battery module, and then a plurality of battery modules are connected in series, in parallel or in series and parallel to constitute the battery. That is, the plurality of battery cells may directly constitute the battery, or may first constitute a battery module, and then battery modules constitute the battery.

Figure 2:
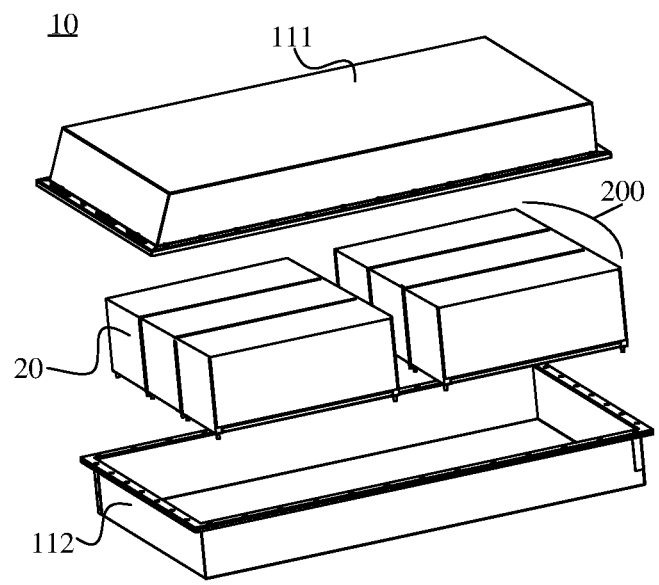
FIG. 2 is a schematic structural diagram of a battery disclosed in an embodiment of the present application.

For example, as shown in FIG. 2, FIG. 2 is a schematic structural diagram of a battery 10 according to an embodiment of the present application. The battery 10 may include at least one battery module 200. The battery module 200 includes a plurality of battery cells 20. The battery 10 may further include a box, an inside of the box is a hollow structure, and the plurality of battery cells 20 are accommodated in the box. As shown in FIG. 2, the box may include two portions, which are referred to as a first portion 111 and a second portion 112, respectively, and the first portion 111 and the second portion 112 are fastened together. Shapes of the first portion 111 and the second portion 112 may be determined according to a shape of combined battery modules 200, and at least one of the first portion 111 and the second portion 112 has an opening. For example, as shown in FIG. 2, the first portion 111 and the second portion 112 each may be a hollow cuboid and each have only one face as an opening face, and an opening of the first portion 111 is arranged opposite to an opening of the second portion 112. The first portion 111 and the second portion 112 are fastened to each other to form a box with a closed chamber. For another example, different from that shown in FIG. 2, only one of the first portion 111 and the second portion 112 may be a hollow cuboid with an opening, and the other may be in a plate shape to cover the opening. For example, in an example that the second portion 112 is a hollow cuboid and has only one face as an opening face and the first portion 111 is in a plate shape, then the opening of the second portion 112 is covered by the first portion 111 to form a box with a closed chamber, and the chamber may be configured to accommodate the plurality of battery cells 20. The plurality of battery cells 20 are combined in parallel connection or series connection or series-parallel connection and then placed in the box formed after the first portion 111 to the second portion 112 are fastened.

Optionally, the battery 10 may further include other structures, which will not be repeated redundantly herein. For example, the battery 10 may further include a bus component. The bus component is configured to implement electrical connection between the plurality of battery cells 20, such as parallel connection, series connection or series-parallel connection. Specifically, the bus component may implement the electrical connection between the battery cells 20 by connecting electrode terminals of the battery cells 20. Further, the bus component may be fixed to the electrode terminals of the battery cells 20 by means of welding. Electric energy of the plurality of battery cells 20 may be further led out through an electrically conductive mechanism to pass through the box.

Figure 3:
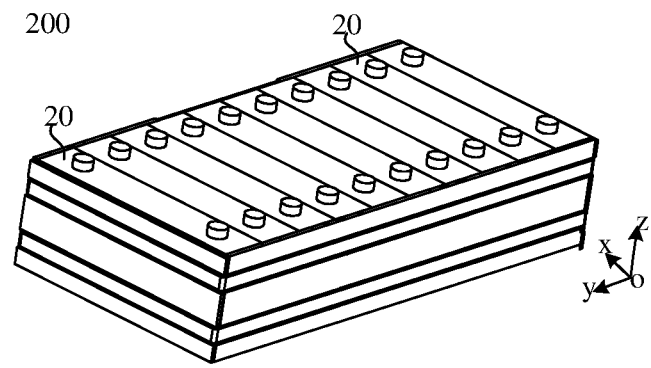
FIG. 3 is a schematic structural diagram of a battery cell group disclosed in an embodiment of the present application.

According to different power demands, the number of battery cells 20 in the battery module 200 may be set to any value. The plurality of battery cells 20 may be connected in series, in parallel or in series and parallel to implement larger capacity or power. Since there may be many battery cells 20 included in each battery 10, the battery cells 20 are arranged in groups for convenience of installation, and each group of battery cells 20 constitutes a battery module 200. The number of battery cells 20 included in the battery module 200 is not limited and may be set according to demands. For example, FIG. 3 is an example of the battery module 200. A battery may include a plurality of battery modules 200, and these battery modules 200 may be connected in series, in parallel or in series and parallel.

Figure 4:
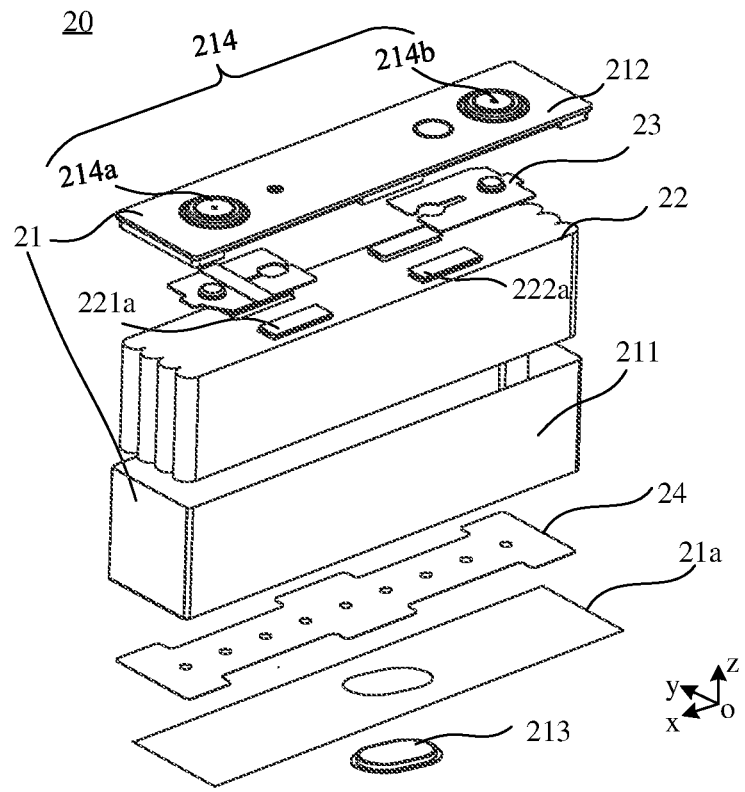
FIG. 4 is an exploded view of a battery cell disclosed in an embodiment of the present application.

FIG. 4 is a schematic structural view of a battery cell 20 according to an embodiment of the present application. The battery cell 20 includes one or more electrode assemblies 22, a housing 211 and a cover plate 212. The housing 211 and the cover plate 212 form a shell. A wall of the housing 211 and the cover plate 212 each are referred to as a wall of the battery cell 20. The housing 211 is shaped according to a shape of the one or more combined electrode assemblies 22. For example, the housing 211 may be a hollow cuboid or cube or cylinder, and one face of the housing 211 has an opening, so that the one or more electrode assemblies 22 may be placed in the housing 211. For example, when the housing 211 is a hollow cuboid or cube, one plane of the housing 211 is an opening face, that is, the plane does not have a wall, so that an inside and outside of the housing 211 are in communication with each other. When the housing 211 may be a hollow cylinder, an end face of the housing 211 is an opening face, that is, the end face does not have a wall, so that an inside and outside of the housing 211 are in communication with each other. The cover plate 212 covers the opening and is connected to the housing 211 to form a closed cavity in which the electrode assemblies 22 are placed. The housing 211 is filled with an electrolyte, such as an electrolytic solution.

The battery cell 20 may further include two electrode terminals 214, and the two electrode terminals 214 may be disposed on the cover plate 212. The cover plate 212 is generally in a shape of a flat plate, and the two electrode terminals 214 are fixed on a flat plate face of the cover plate 212. The two electrode terminals 214 are a positive electrode terminal 214a and a negative electrode terminal 214b, respectively. Each electrode terminal 214 is correspondingly provided with a connecting member 23, which is located between the cover plate 212 and the electrode assembly 22 and configured to electrically connect the electrode assembly 22 to the electrode terminal 214.

As shown in FIG. 4, each electrode assembly 22 has a first tab 221a and a second tab 222a. The first tab 221a and the second tab 222a have opposite polarities. For example, when the first tab 221a is a positive tab, the second tab 222a is a negative tab. The first tab 221a of the one or more electrode assemblies 22 is connected to one electrode terminal through one connecting member 23, and the second tab 222a of the one or more electrode assemblies 22 is connected to the other electrode terminal through the other connecting member 23. For example, the positive electrode terminal 214a is connected to the positive tab through one connecting member 23, and the negative electrode terminal 214b is connected to the negative tab through the other connecting member 23.

In this battery cell 20, according to actual use demands, the electrode assembly 22 may be set to be single or multiple in number. As shown in FIG. 4, four independent electrode assemblies 22 are disposed in the battery cell 20.

As shown in FIG. 4, a pressure relief mechanism 213 may be disposed on one wall of the battery cell 20, for example, the pressure relief mechanism 213 may be disposed on a first wall 21a of the battery cell 20. The first wall 21a in FIG. 4 is separated from the housing 211, that is, a bottom side of the housing 211 has an opening, the first wall 21a covers the opening at the bottom side and is connected to the housing 211, and the connection manner may be welding, connecting with an adhesive, or the like. Alternatively, the first wall 21a and the housing 211 may also be an integral structure. The pressure relief mechanism 213 is configured to be actuated when an internal pressure or temperature of the battery cell 20 reaches a threshold, to relieve the internal pressure or temperature.

The pressure relief mechanism 213 may be a part of the first wall 21a, or may be a separate structure from the first wall 21a, and is fixed to the first wall 21a by means of welding, for example. When the pressure relief mechanism 213 is a part of the first wall 21a, for example, the pressure relief mechanism 213 may be formed by providing an indentation on the first wall 21a, and a thickness of the first wall 21a corresponding to the indentation is smaller than that of another region of the pressure relief mechanism 213 other than the indentation. The indentation is the weakest position of the pressure relief mechanism 213. When excessive gas generated by the battery cell 20 causes an internal pressure of the housing 211 to rise and reach a threshold, or heat generated by an internal reaction of the battery cell 20 causes an internal temperature of the battery cell 20 to rise and reach a threshold, the pressure relief mechanism 213 may be fractured at the indentation, resulting in the communication between the inside and outside of the housing 211. The gas pressure and temperature are released outward through the cracking of the pressure relief mechanism 213, thereby avoid explosion of the battery cell 20.

Optionally, in an embodiment of the present application, as shown in FIG. 4, in a case where the pressure relief mechanism 213 is disposed on the first wall 21a of the battery cell 20, a second wall of the battery cell 20 is provided with electrode terminals 214, and the second wall is different from the first wall 21a.

Optionally, the second wall is arranged opposite to the first wall 21a. For example, the first wall 21a may be a bottom wall of the battery cell 20, and the second wall may be the cover plate 212 of the battery cell 20.

Optionally, as shown in FIG. 4, the battery cell 20 may further include a backing plate 24. The backing plate 24 is located between the electrode assembly 22 and a bottom wall of the housing 211, may play a role of supporting the electrode assembly 22, and may also effectively prevent the electrode assembly 22 from interfering with rounded corners of a periphery of the bottom wall of the housing 211. In addition, one or more through holes may be disposed on the backing plate 24. For example, a plurality of through holes evenly arranged may be disposed, or when the pressure relief mechanism 213 is disposed on the bottom wall of the housing 211, a through hole is disposed at a position corresponding to the pressure relief mechanism 213, so as to guide an electrolytic solution or gas. Specifically, this may cause spaces of an upper surface and a lower surface of the backing plate 24 to be in communication, and gas generated inside the battery cell 20 and the electrolytic solution can freely pass through the backing plate 24.

The pressure relief mechanism 213 and the electrode terminals 214 are disposed on different walls of the battery cell 20, so that when the pressure relief mechanism 213 is actuated, emissions from the battery cell 20 may be farther away from the electrode terminals 214, thereby reducing the impact of the emissions on the electrode terminals 214 and the bus component, and therefore safety of the battery could be enhanced.

Further, when the electrode terminals 214 are disposed on the cover plate 212 of the battery cell 20, the pressure relief mechanism 213 is disposed on a bottom wall of the battery cell 20, so that when the pressure relief mechanism 213 is actuated, the emissions from the battery cell 20 may be are discharged to a bottom of the battery 10. In this way, on one hand, a risk of the emissions may be reduced by using a thermal management component at the bottom of the battery 10, and on the other hand, when the battery 10 is disposed in a vehicle, the bottom of the battery 10 is usually away from a passenger, thereby reducing harm to the passenger.

The pressure relief mechanism 213 may be in various possible pressure relief structures, which is not limited in the embodiments of the present application. For example, the pressure relief mechanism 213 may be a temperature-sensitive pressure relief mechanism, the temperature-sensitive pressure relief mechanism is configured to be capable of being melted when the internal temperature of the battery cell 20 provided with the pressure relief mechanism 213 reaches a threshold; and/or the pressure relief mechanism 213 may be a pressure-sensitive pressure relief mechanism, and the pressure-sensitive pressure relief mechanism is configured to be capable of being fractured when an internal gas pressure of the battery cell 20 provided with the pressure relief mechanism 213 reaches a threshold.

Figure 5:
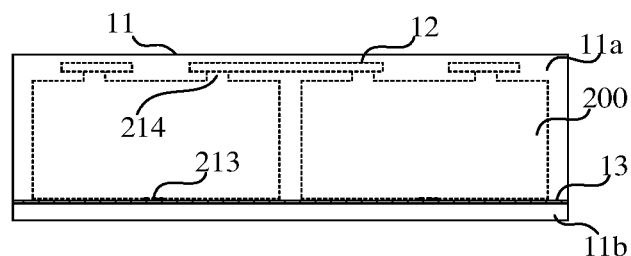
FIG. 5 is a schematic structural diagram of a battery disclosed in an embodiment of the present application.

FIG. 5 is a schematic diagram of a box 11 of a battery 10 according to an embodiment of the present application. As shown in FIG. 5, the box 11 may include an electrical chamber 11a, a collection chamber 11b, and a thermal management component 13. The thermal management component 13 is configured to isolate the electrical chamber 11a from the collection chamber 11b. The so-called "isolation" here refers to separation, which may refer to unsealing.

The electrical chamber 11a is configured to accommodate a plurality of battery cells 20 and a bus component 12. The electrical chamber 11a provides an accommodation space for the battery cells 20 and the bus component 12, and a shape of the electrical chamber 11a may be determined according to the plurality of battery cells 20 and the bus component 12.

The bus component 12 is configured to implement electrical connection between the plurality of battery cells 20. The bus component 12 may implement the electrical connection between the battery cells 20 by connecting electrode terminals 214 of the battery cells 20.

At least one of the plurality of battery cells 20 may include a pressure relief mechanism 213. The pressure relief mechanism 213 is configured to be actuated when an internal pressure or temperature of the battery cell 20 provided with the pressure relief mechanism 213 reaches a threshold, to relieve the internal pressure or temperature.

For convenience of description, a battery cell 20 involved in the following related description about the pressure relief mechanism 213 refers to a battery cell 20 provided with a pressure relief mechanism 213. For example, the battery cell 20 may be the battery cell 20 in FIG. 4.

The thermal management component 13 is configured to accommodate a fluid to adjust a temperature of the plurality of battery cells 20. In a case of lowering the temperature of the battery cells 20, the thermal management component 13 may accommodate a cooling medium to adjust the temperature of the plurality of battery cells 20. In this case, the thermal management component 13 may also be called a cooling component, a cooling system, a cooling plate, or the like. In addition, the thermal management component 13 may also be configured for heating, which is not limited in the embodiments of the present application. Optionally, the fluid may flow in a circulating manner to achieve a better temperature adjustment effect.

The collection chamber 11b is configured to collect emissions from the battery cell 20 provided with the pressure relief mechanism 213 when the pressure relief mechanism 213 is actuated.

In the embodiment of the present application, the electrical chamber 11a is isolated from the collection chamber 11b using the thermal management component 13. That is, the electrical chamber 11a for accommodating the plurality of battery cells 20 and the bus component 12 is arranged to be separated from the collection chamber 11b for collecting the emissions. In this way, when the pressure relief mechanism 213 is actuated, the emissions from the battery cell 20 enter the collection chamber 11b, and do not enter the electrical chamber 11a or enter the electrical chamber 11a in a small amount, thereby not affecting the electrical connection in the electrical chamber 11a, and therefore the safety of the battery could be enhanced.

Optionally, in an embodiment of the present application, the thermal management component 13 has a wall shared by the electrical chamber 11a and the collection chamber 11b. As shown in FIG. 5, the thermal management component 13 may be both a wall of the electrical chamber 11a and a wall of the collection chamber 11b. That is, the thermal management component 13 (or a part thereof) may directly serve as a wall shared by the electrical chamber 11a and the collection chamber 11b. In this way, the emissions from the battery cell 20 may enter the collection chamber 11b through the thermal management component 13. Meanwhile, due to the existence of the thermal management component 13, the emissions may be isolated from the electrical chamber 11a as far as possible, thereby reducing the risk of the emissions and enhancing the safety of the battery.

Optionally, in an embodiment of the present application, the electrical chamber 11a may be formed from a covering having an opening, and a thermal management component 13. As for the collection chamber 11b, it may be formed from a thermal management component 13 and a protective member.

The collection chamber 11b formed from the protective member and the thermal management component 13 does not occupy a space that may accommodate the battery cells. Therefore, the collection chamber 11b with a larger space may be provided, so as to effectively collect and buffer the emissions and reduce the risk of the emissions.

Optionally, in an embodiment of the present application, a fluid, such as a cooling medium, or a component for accommodating the fluid may be further disposed in the collection chamber 11b to further lower the temperature of the emissions entering the collection chamber 11b.

Optionally, in an embodiment of the present application, the collection chamber 11b may be a sealed chamber. For example, the connection between the protective member and the thermal management component 13 may be sealed by a sealing member.

Optionally, in an embodiment of the present application, the collection chamber 11b may not be a sealed chamber. For example, the collection chamber 11b may be in communication with outside air, and thus part of the emissions may be further discharged to an outside of the box 11.

When the pressure relief mechanism 213 is actuated, the pressure relief mechanism 213 is opened to discharge the emissions in the battery cell 20. The emissions may damage the thermal management component 13, thus pass through the thermal management component 13 and enter the collection chamber 11b.

Optionally, in an embodiment of the present application, in order to facilitate the passage of the emissions through the thermal management component 13, the thermal management component 13 may be provided with a pressure relief zone. The pressure relief zone is configured to enable the emissions from the battery cell 20 provided with the pressure relief mechanism 213 to pass through the pressure relief zone and enter the collection chamber 11b when the pressure relief mechanism 213 is actuated.

The pressure relief zone according to the embodiment of the present application may be arranged opposite to the pressure relief mechanism 213. In this way, when the pressure relief mechanism 213 is actuated, the emissions may directly impact on the pressure relief zone and be discharged through the pressure relief zone. However, when the battery cell 20 is installed, how to align the pressure relief mechanism 213 of the battery cell 20 with the pressure relief zone of the thermal management component 13 is a problem that needs to be solved at present. Otherwise, if the pressure relief mechanism 213 is not aligned with the pressure relief zone, when the pressure relief mechanism 213 is actuated, the thermal management component 13 may affect the pressure relief mechanism 213 to deform, which may cause explosion of the battery cell 20.

Figure 6:
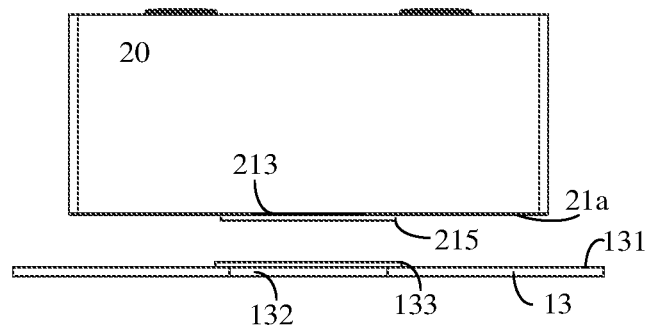
FIG. 6 is an exploded view of a battery cell and a thermal management component in a battery disclosed in an embodiment of the present application.
Figure 10:
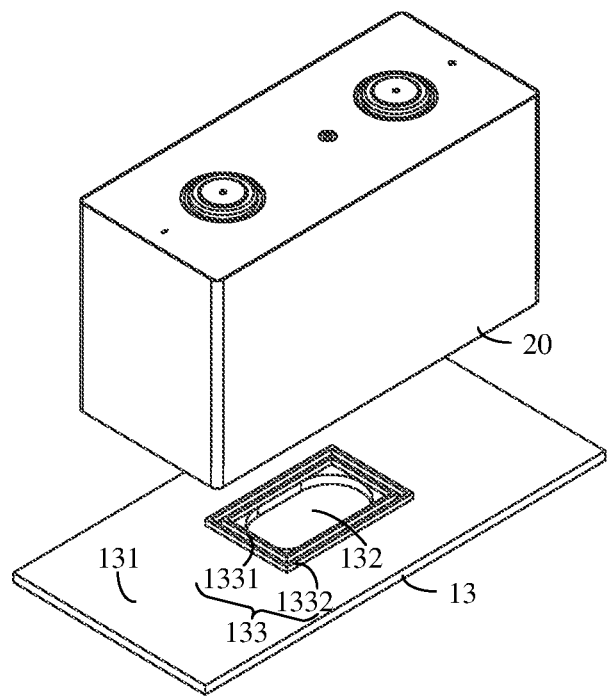
FIG. 10 is an exploded view of a battery cell and a thermal management component in another battery disclosed in an embodiment of the present application.

Therefore, an embodiment of the present application provides a battery, which could solve the foregoing problem. FIG. 6 shows another schematic diagram of a partial exploded view of a battery 10 according to an embodiment of the present application, where the battery 10 may include a battery cell 20 and a thermal management component 13 as shown in FIG. 10. Specifically, the battery cell 20 may be any one of battery cells 20 included in the battery 10. The battery cell 20 includes: a pressure relief mechanism 213, the pressure relief mechanism 213 being disposed on a first wall 21a of the battery cell 20, and the pressure relief mechanism 213 being configured to be actuated when an internal pressure or temperature of the battery cell 20 reaches a threshold, to relieve the internal pressure. The thermal management component 13 is configured to accommodate a fluid to adjust a temperature of the battery cell 20, a first surface 131 of the thermal management component 13 being attached to the first wall 21a, and the thermal management component 13 being provided with a pressure relief zone 132, so that emissions discharged from an inside of the battery cell 20 are capable of being discharged through the pressure relief zone 132 when the pressure relief mechanism 213 is actuated.

As shown in FIG. 6, the first wall 21a of the battery cell 20 according to the embodiment of the present application is provided with a first restraint member 215, the thermal management component 13 is provided with a second restraint member 133, and the first restraint member 215 and the second restraint member 133 are arranged to be mated, so that the pressure relief mechanism 213 is arranged opposite to the pressure relief zone 132.

Therefore, according to a battery 10 of an embodiment of the present application, a first restraint member 215 is disposed on a first wall 21a where a pressure relief mechanism 213 of a battery cell 20 is located, and a second restraint member 133 is disposed on a thermal management component 13. In this way, opposite arrangement of the pressure relief mechanism 213 and a pressure relief zone 132 could be accurately achieved through mating arrangement of the first restraint member 215 and the second restraint member 133, which is convenient for alignment installation of the pressure relief mechanism 213 and the pressure relief zone 132, so that emissions discharged from the battery cell 20 are capable of being discharged smoothly through the pressure relief zone 132 when the pressure relief mechanism 213 is actuated, and explosion of the battery cell 20 is effectively avoided.

It should be understood that the battery 10 in FIG. 6 may be the foregoing battery 10 in FIG. 1 to FIG. 5, and is applicable to the related description. The battery cell 20 may be any one of the foregoing battery cells 20 in FIG. 1 to FIG. 5, and is also applicable to the related description, which will not be repeated redundantly herein for brevity.

It should be understood that the attachment of the first surface 131 to the first wall 21a according to the embodiment of the present application includes direct contact of the first surface 131 with the first wall 21a, and may also include connection of the first surface 131 to the first wall 21a through a thermally conductive adhesive or other substances to achieve a heat exchange.

It should be understood that the pressure relief zone 132 disposed on the thermal management component 13 according to the embodiment of the present application may adopt various arrangements that facilitate the damage by the emissions, which is not limited in the embodiments of the present application, and will be illustrated by way of example below.

It should be understood that the thermal management component 13 according to the embodiment of the present application may accommodate the fluid. For example, the thermal management component 13 may be provided with a flow channel, and the fluid is accommodated in the flow channel, so that the flow channel on the thermal management component 13 is capable of being damaged by the emissions discharged from the battery cell 20 when the pressure relief mechanism 213 is actuated, to flow the internal fluid out and perform a temperature lowering process on the emissions. The pressure relief zone 132 may be disposed between adjacent flow channels, or may also be disposed on a flow channel, and the embodiment of the present application is not limited thereto.

Optionally, as an embodiment, the pressure relief zone 132 may be configured as a through hole. Optionally, a hole wall of the through hole may be a wall of the flow channel. When the pressure relief mechanism 213 is actuated, on one hand, the pressure relief mechanism 213 may be opened toward the through hole to discharge the emissions in the battery cell 20, and the emissions are discharged through the through hole, for example, may enter a collection chamber under the thermal management component 13 through the through hold, so as to relieve the pressures and temperatures of the battery cell 20 and an electrical chamber where the battery cell 20 is located. Meanwhile, when passing through the through hole of the pressure relief zone 132, the high-temperature emissions could melt the hole wall of the through hole, that is, destroying the flow channel, so that the fluid in the flow channel is discharged. In this case, the fluid and the emissions cooled by the fluid could enter a collection chamber 11b together. Since the cooling by the fluid can quickly reduce the temperature of the emissions from the battery cell 20, a risk of the emissions entering the collection chamber 11b is greatly reduced, which does not have a great impact on other parts of the battery 10, such as other battery cells 20, so that destructiveness caused by abnormality of a single battery cell 20 could be suppressed as soon as possible, and the possibility of explosion of the battery 10 could be reduced.

Optionally, as another embodiment, the pressure relief zone 132 may also be configured as a weakened zone. In this way, when the pressure relief mechanism 213 is not actuated, the thermal management component 13 keeps an electrical chamber 11a and the collection chamber 11b relatively isolated, which could avoid substances in the collection chamber 11b to enter the electrical chamber 11a. Specifically, the weakened zone may be a groove, that is, a groove is disposed at a position of the thermal management component 13 opposite to the pressure relief mechanism 213. A thickness of the thermal management component 13 at a bottom wall of the groove is smaller than a thickness of the thermal management component 13 at another region other than the groove, so that the bottom wall of the groove is weaker than another region on the thermal management component 13, and is more easily damaged by the emissions. Then, the bottom wall of the groove may form the pressure relief zone 132, so that the emissions could damage the bottom wall of the groove when the pressure relief mechanism 213 is actuated, to further enter the collection chamber 11b.

Optionally, an opening of the groove may face the pressure relief mechanism 213, so that there is a gap between the pressure relief mechanism 213 and the bottom wall of the groove to provide a deformation space for the pressure relief mechanism 213 when it is actuated; or an opening of the groove may also face away from the pressure relief mechanism 213, a deformation space for the pressure relief mechanism 213 is provided in other ways, and the embodiment of the present application is not limited thereto.

Optionally, the pressure relief zone 132 of the thermal management component 13 is a weakened zone, which may also be achieved by providing different materials. For example, a melting point of a material of the pressure relief zone 132 is set to be smaller than a melting point of a material of another region on the thermal management component 13 other than the pressure relief zone 132. In this way, the pressure relief zone 132 is more easily damaged by the high-temperature emissions discharged from the battery cell 20, so that the emissions enter the collection chamber 11b through the damaged pressure relief zone 132.

In addition to the foregoing through hole or weakened zone, the pressure relief zone 132 according to the embodiment of the present application may also be achieved in other ways, which will not be enumerated herein.

It should be understood that an area, a shape and a material of the pressure relief zone 132 according to the embodiment of the present application may be flexibly set according to actual applications. For example, in order to make the pressure relief zone 132 not affect the deformation of the pressure relief mechanism 213 when it is actuated, the shape of the pressure relief zone 132 may be consistent with the shape of the pressure relief mechanism 213, the area of the pressure relief zone 132 may be set to be larger than or equal to an area of the pressure relief mechanism 213, and the embodiment of the present application is not limited thereto.

As shown in FIG. 6, in order to make the pressure relief mechanism 213 more accurately arranged opposite to the pressure relief zone 132, the first restraint member 215 is disposed on the first wall 21a where the pressure relief mechanism 213 according to the embodiment of the present application is located, the second restraint member 133 is disposed on the thermal management component 13, and the first restraint member 215 is arranged to be mated with the second restraint member 133, so that the pressure relief mechanism 213 is arranged opposite to the pressure relief zone 132 more accurately.

The first restraint member 215 and the second restraint member 133 according to the embodiment of the present application will be described in detail below with reference to the accompanying drawings.

Optionally, the mating arrangement of the first restraint member 215 and the second restraint member 133 according to the embodiment of the present application may be achieved through a protrusion structure and a groove structure. Specifically, the first restraint member 215 may include a protrusion structure and the second restraint member 133 includes a groove structure; or the first restraint member 215 includes a groove structure and the second restraint member 133 includes a protrusion structure; where the protrusion structure is at least partially accommodated in the groove structure, so that the first restraint member 215 is mated with the second restraint member 133. The mating arrangement of the first restraint member 215 and the second restraint member 133 is achieved through a groove structure and a protrusion structure, which is convenient for processing, and could facilitate installation and fixation of the pressure relief mechanism 213 and the pressure relief zone 133.

It should be understood that, in consideration of the need of a certain deformation space when the pressure relief mechanism 213 is actuated, a gap between the pressure relief mechanism 213 and the first surface 131 may be achieved after the battery cell 20 and the thermal management component 13 are installed by the provided first restraint member 215 and second restraint member 133. The gap is configured to provide the deformation space for the pressure relief mechanism 213, so that the pressure relief mechanism 213 deforms toward the thermal management component 13. Optionally, the gap may be achieved by setting a height of the protrusion structure to be greater than a depth of the groove structure, and the embodiment of the present application is not limited thereto.

It should be understood that, in order to achieve accurate positioning of the pressure relief mechanism 213 and the pressure relief zone 132, positions of the first restraint member 215 and the second restraint member 133 according to the embodiment of the present application are related to those of the pressure relief mechanism 213 and the pressure relief zone 132. Examples will be described below with reference to the accompanying drawings.

Figure 7:
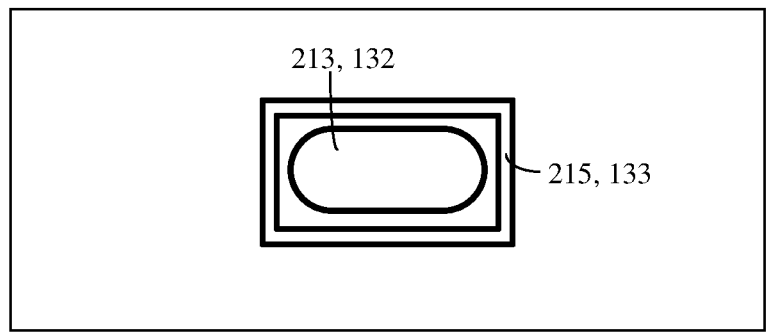
FIG. 7 is a bottom view of a battery cell disclosed in an embodiment of the present application.
Figure 8:
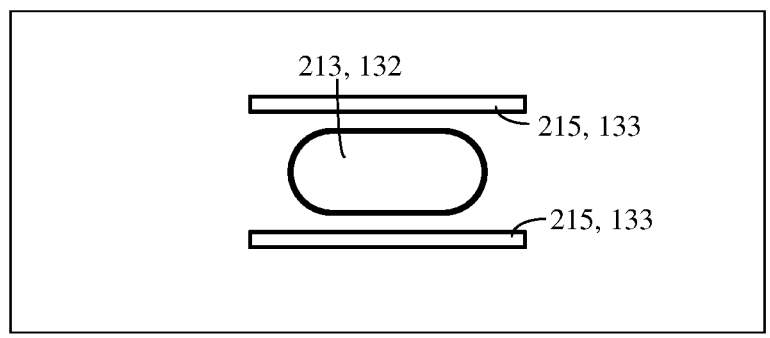
FIG. 8 is a bottom view of another battery cell disclosed in an embodiment of the present application.
Figure 9:
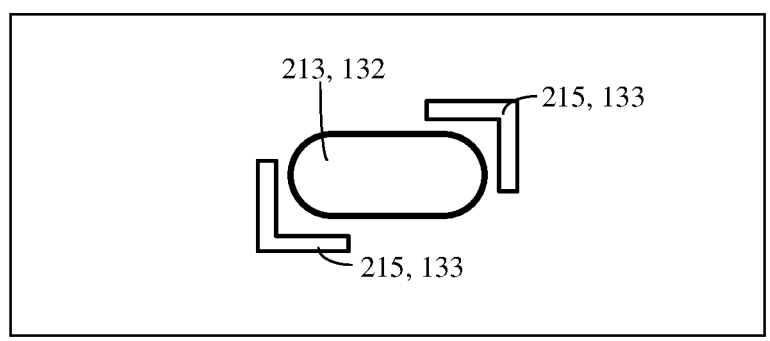
FIG. 9 is a bottom view of a further battery cell disclosed in an embodiment of the present application.

Optionally, for convenience of illustration, the embodiment of the present application is illustrated by an example that the shapes of the pressure relief mechanism 213 and the pressure relief zone 132 are the same, specifically, an example that the shapes of the pressure relief mechanism 213 and the pressure relief zone 132 are both racetrack shapes. FIG. 7 to FIG. 9 are several bottom views of a battery cell 20 according to an embodiment of the present application, respectively, that is, respectively showing possible arrangements of the pressure relief mechanism 213 and the first restraint member 215 on the first wall 21a. In other words, FIG. 7 to FIG. 9 are several top views of a thermal management component 13 according to an embodiment of the present application, respectively, that is, respectively showing possible arrangements of the pressure relief zone 132 and the second restraint member 133 on the first surface 131. Specifically, FIG. 7 to FIG. 9 may show the first restraint member 215 disposed around the pressure relief mechanism 213, and the first restraint member 215 in the drawings may include a protrusion structure, or the first restraint member 215 in the drawings may include a groove structure. In addition, FIG. 7 to FIG. 9 may also show the second restraint member 133 disposed around the pressure relief zone 132, and the second restraint member 133 in the drawings may include a protrusion structure, or the second restraint member 133 in the drawings may include a groove structure.

Optionally, the numbers of the first restraint members 215 and the second restraint members 133 according to the embodiment of the present application may be set according to actual applications, and the number of the first restraint members 215 may be the same as or different from the number of the second restraint members 133. For example, as shown in FIG. 7, the first restraint member 215 may be an annular structure surrounding a periphery of the pressure relief mechanism 213; and/or the second restraint member 133 may be an annular structure surrounding a periphery of the pressure relief zone 132. For another example, as shown in FIG. 8 and FIG. 9, two first restraint members 215 may be disposed around the pressure relief mechanism 213; and/or two second restraint members 133 may be disposed around the pressure relief zone 132. For another example, the number of the first restraint members 215 and the number of the second restraint members 133 may be the same, for example, the first restraint member 215 adopts the arrangement as shown in FIG. 7, while the second restraint member 133 also adopts the arrangement as shown in FIG. 7, so as to facilitate processing and installation; or the number of the first restraint members 215 and the number of the second restraint members 133 may be different, for example, the first restraint member 215 adopts the arrangement as shown in FIG. 7, while the second restraint member 133 adopts the arrangement as shown in FIG. 8 or FIG. 9, and the embodiment of the present application is not limited thereto.

Optionally, positions and shapes of the first restraint member 215 and the second restraint member 133 according to the embodiment of the present application may also be set according to actual applications. For example, when the first restraint member 215 and/or the second restraint member 133 are set as annular structures, they may be set as square annular structures as shown in FIG. 7, or may be set in a circular shape, or as other annular structures.

For another example, when at least two first restraint members 215 are disposed around the pressure relief mechanism 213, and/or when at least two second restraint members 133 are disposed around the pressure relief zone 132, positions of a plurality of first restraint members 215 may be set according to actual applications, and shapes of the plurality of first restraint members 215 may be the same or different; and positions of a plurality of second restraint members 133 may also be set according to actual applications, and shapes of the plurality of second restraint members 133 may be the same or different. For convenience of installation and positioning, the plurality of first restraint members 215 may be evenly distributed around the pressure relief mechanism 213. Similarly, the plurality of second restraint members 133 may also be evenly distributed around the pressure relief zone 132. For example, as shown in FIG. 8 and FIG. 9, in an example that two first restraint members 215 are provided, one of the two first restraint members 215 may be configured to overlap with the other first restraint member 215 after rotating 180° about a central point of the pressure relief mechanism 213 on the first wall 21a. Similarly, in an example that two second restraint members 132 are provided, one of the two second restraint members 133 may be configured to overlap with the other second restraint member 133 after rotating 180° about a central point of the pressure relief zone 132 on the first surface 131. Moreover, as shown in FIG. 8 and FIG. 9, the two first restraint members 215 and/or the two second restraint members 133 may be set in a linear type, or may be set in a right angle shape, or may also be set in another shape, and the embodiment of the present application is not limited thereto.

Optionally, positions and shapes of the first restraint member 215 and the second restraint member 133 according to the embodiment of the present application may be the same or different. For example, the mating arrangement of the first restraint member 215 and the second restrain member 133 may be achieved in any combination of FIG. 7 to FIG. 9. For example, when the first restraint member 215 adopts the arrangement as shown in FIG. 7, the second restraint member 133 may be arranged in any one of the arrangements in FIG. 7 to FIG. 9, which could achieve the mating arrangement of the first restraint member 215 and the second restraint member 133, so as to achieve accurate alignment of the pressure relief mechanism 213 and the pressure relief zone 133.

For convenience of illustration, the following will be described by an example that the first restraint member 215 and the second restraint member 133 both adopt annular structures, the first restraint member 215 includes a protrusion structure, and the second restraint member 133 includes a groove structure. Specifically, FIG. 10 shows an exploded view of a battery cell 20 and a thermal management component 13 in a battery 10 according to an embodiment of the present application, FIG. 11 shows a sectional view of the battery cell 20 and the thermal management component 13 in FIG. 10 after installation, and FIG. 12 shows an exploded view of a region A in FIG. 11.

Figure 11:
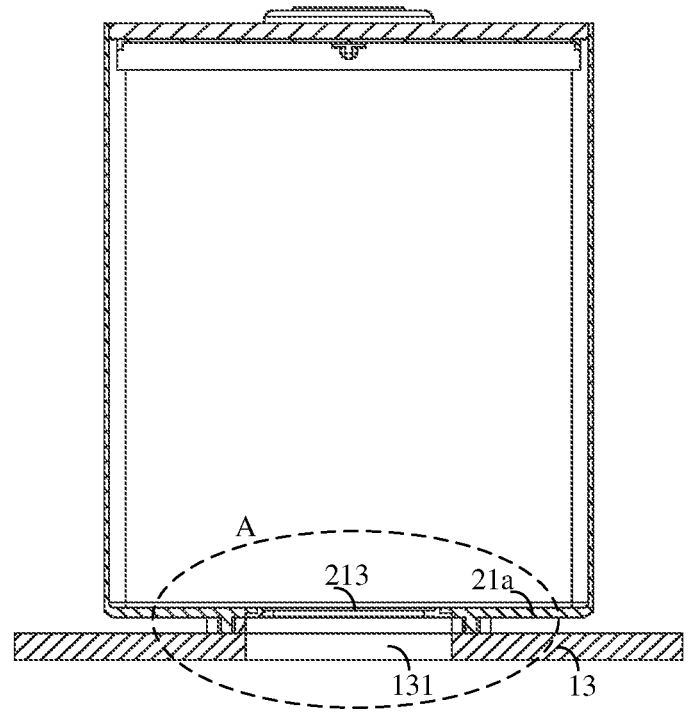
FIG. 11 is a sectional view of a battery cell and a thermal management component disclosed in an embodiment of the present application.
Figure 12:
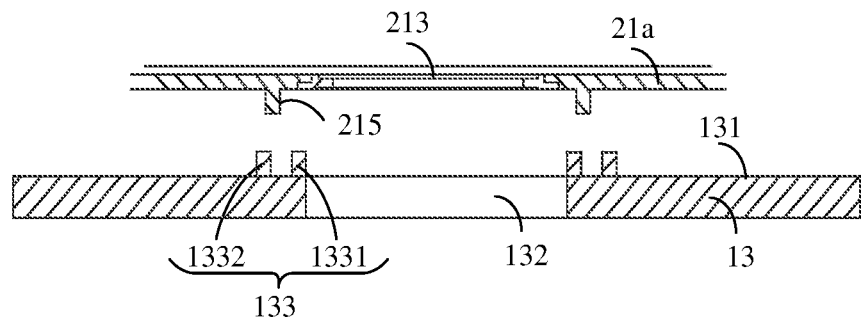
FIG. 12 is a partial exploded view of a battery cell and a thermal management component disclosed in an embodiment of the present application.

As shown in FIG. 10 to FIG. 12, the first restraint member 215 includes an annular protrusion structure, and the second restraint member 133 includes an annular groove structure. Specifically, a first protrusion 1331 and a second protrusion 1332 are arranged in sequence around the pressure relief zone 132 in a direction outward from a center of the pressure relief zone 132, the groove structure of the second restraint member 133 is formed between the first protrusion 1331 and the second protrusion 1332, and the groove structure is configured to accommodate the protrusion structure of the first restraint member 215, so that the first restraint member 215 is arranged to be mated with and the second restraint member 133.

Similarly, if the second restraint member 133 includes an annular protrusion structure, and the first restraint member 215 includes an annular groove structure, then a third protrusion and a fourth protrusion are arranged in sequence around the pressure relief mechanism 213 in a direction outward from a center of the pressure relief mechanism 213, the groove structure is formed between the third protrusion and the fourth protrusion, and the groove structure is configured to accommodate the first restraint member 215, so that the first restraint member 215 is arranged to be mated with the second restraint member 133.

As shown in FIG. 10 to FIG. 12, whether the first restraint member 215 or the second restraint member 133 includes a groove structure, the groove structure is formed by providing two protrusions, so that the first restraint member 215 could protrude from a surface of the first wall 21a relative to the pressure relief mechanism 213, while the second restraint member 133 also protrudes from the first surface 131 of the thermal management component 13. In this way, when the first restraint member 215 is arranged to be mated with the second restraint member 133, not only accurate alignment of the pressure relief mechanism 213 and the pressure relief zone 132 can be achieved, installation efficiency is improved, but also a gap is provided between the pressure relief mechanism 213 and the first surface 131, which could provide a deformation space for the pressure relief mechanism 213 when it is actuated.

Optionally, the first restraint member 215 on the periphery of the pressure relief mechanism 213 and/or the second restraint member 133 on the periphery of the pressure relief zone 132 according to the embodiment of the present application may be selected from plastic or another high polymer fireproof and high-temperature material, such as polycarbonate, so that the first restraint member 215 and the second restraint member 133 could withstand the impact of high temperature gas in a short time. In this way, if the first restraint member 215 and the second restraint member 133 are configured as annular structures, then the first restraint member 215 and the second restraint member 133 also have a sealing effect after being arranged to be mated. When the pressure relief mechanism 213 is actuated, the first restraint member 215 and the second restraint member 133 could be kept sealed for a certain period of time, which prevents the emissions discharged from the battery cell 20 from entering the electrical chamber, and reduces risks of short circuit and thermal diffusion. It is as far as possible to ensure that the high-temperature emissions are discharged to the collection chamber 11b only through the pressure relief zone 132, to further reduce the risk of explosion of the battery 10.

The battery and the power consumption device according to the embodiments of the present application are described above. A method and apparatus for producing a battery according to the embodiments of the present application will be described below, and for the parts that are not described in detail, reference is made to the foregoing embodiments.

Figure 13:
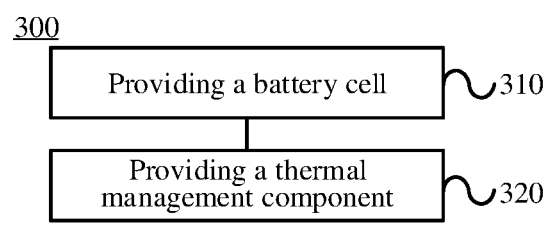
FIG. 13 is a schematic flowchart of a method for producing a battery disclosed in an embodiment of the present application.

FIG. 13 shows a schematic flowchart of a method 300 for producing a battery according to an embodiment of the present application. As shown in FIG. 13, the method 300 may include: S310, providing a battery cell, the battery cell including a pressure relief mechanism, the pressure relief mechanism being disposed on a first wall of the battery cell, and the pressure relief mechanism being configured to be actuated when an internal pressure or temperature of the battery cell reaches a threshold, to relieve the internal pressure; and S320, providing a thermal management component, the thermal management component being configured to accommodate a fluid to adjust a temperature of the battery cell, a first surface of the thermal management component being attached to the first wall, and the thermal management component being provided with a pressure relief zone, so that emissions discharged from an inside of the battery cell are capable of being discharged through the pressure relief zone when the pressure relief mechanism is actuated; where the first wall is provided with a first restraint member, the thermal management component is provided with a second restraint member, and the first restraint member and the second restraint member are arranged to be mated, so that the pressure relief mechanism is arranged opposite to the pressure relief zone.

Figure 14:
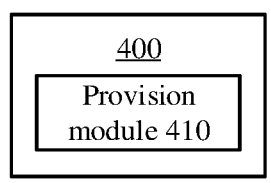
FIG. 14 is a schematic block diagram of an apparatus for producing a battery disclosed in an embodiment of the present application.

FIG. 14 shows a schematic block diagram of an apparatus 400 for producing a battery according to an embodiment of the present application. As shown in FIG. 14, the apparatus 400 may include: a provision module 410. The provision module 410 is configured to: provide a battery cell, the battery cell including a pressure relief mechanism, the pressure relief mechanism being disposed on a first wall of the battery cell, and the pressure relief mechanism being configured to be actuated when an internal pressure or temperature of the battery cell reaches a threshold, to relieve the internal pressure; and provide a thermal management component, the thermal management component being configured to accommodate a fluid to adjust a temperature of the battery cell, a first surface of the thermal management component being attached to the first wall, and the thermal management component being provided with a pressure relief zone, so that emissions discharged from an inside of the battery cell are capable of being discharged through the pressure relief zone when the pressure relief mechanism is actuated; where the first wall is provided with a first restraint member, the thermal management component is provided with a second restraint member, and the first restraint member and the second restraint member are arranged to be mated, so that the pressure relief mechanism is arranged opposite to the pressure relief zone.

Although the present application is already described with reference to the preferred embodiments, various improvements may be made to the present application and the components therein may be replaced with equivalents without departing from the scope of the present application. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A battery, comprising:
a battery cell comprising a pressure relief mechanism, the pressure relief mechanism being disposed on a first wall of the battery cell, and the pressure relief mechanism being configured to be actuated when an internal pressure or temperature of the battery cell reaches a threshold, to relieve the internal pressure; and
an electrical chamber configured to accommodate the battery cells;
a collection chamber configured to collect emissions from the battery cell when the pressure relief mechanism is actuated;
a thermal management component configured to isolate the electrical chamber from the collection chamber, and to accommodate a fluid to adjust a temperature of the battery cell, a first surface of the thermal management component being attached to the first wall, and the thermal management component being provided with a pressure relief zone, so that emissions discharged from an inside of the battery cell are capable of being discharged through the pressure relief zone to the collection chamber when the pressure relief mechanism is actuated;
wherein the first wall is provided with a first restraint member, the thermal management component is provided with a second restraint member, and the first restraint member and the second restraint member are arranged to be mated, so that the pressure relief mechanism is arranged opposite to the pressure relief zone.

2. The battery according to claim 1, wherein the first restraint member comprises a protrusion structure and the second restraint member comprises a groove structure, or the first restraint member comprises a groove structure and the second restraint member comprises a protrusion structure; and
the protrusion structure is at least partially accommodated in the groove structure.

3. The battery according to claim 2, wherein a gap is provided between the pressure relief mechanism and the first surface, and the gap is configured to provide a deformation space for the pressure relief mechanism, so that the pressure relief mechanism deforms toward the thermal management component.

4. The battery according to claim 3, wherein a height of the protrusion structure is greater than a depth of the groove structure.

5. The battery according to claim 3, wherein the second restraint member comprises the groove structure, the second restraint member comprises a first protrusion and a second protrusion in sequence around the pressure relief zone in a direction outward from a center of the pressure relief zone, and the groove structure is formed between the first protrusion and the second protrusion.

6. The battery according to claim 3, wherein the first restraint member comprises the groove structure, the first restraint member comprises a third protrusion and a fourth protrusion in sequence around the pressure relief mechanism in a direction outward from a center of the pressure relief mechanism, and the groove structure is formed between the third protrusion and the fourth protrusion.

7. The battery according to claim 2, wherein two first restraint members are disposed around the pressure relief mechanism, and one of the two first restraint members overlaps with the other first restraint member after rotating 180° about a central point of the pressure relief mechanism on the first wall.

8. The battery according to claim 7, wherein two second restraint members are disposed around the pressure relief zone, and one of the two second restraint members overlaps with the other second restraint member after rotating 180° about a central point of the pressure relief zone on the first surface.

9. The battery according to claim 1, wherein two first restraint members are disposed around the pressure relief mechanism, and one of the two first restraint members overlaps with the other first restraint member after rotating 180° about a central point of the pressure relief mechanism on the first wall.

10. The battery according to claim 9, wherein two second restraint members are disposed around the pressure relief zone, and one of the two second restraint members overlaps with the other second restraint member after rotating 180° about a central point of the pressure relief zone on the first surface.

11. The battery according to claim 1, wherein the first restraint member is an annular structure surrounding a periphery of the pressure relief mechanism.

12. The battery according to claim 11, wherein the second restraint member is an annular structure surrounding a periphery of the pressure relief zone.

13. The battery according to claim 1, wherein an area of the pressure relief zone is larger than or equal to an area of the pressure relief mechanism.

14. The battery according to claim 1, wherein the pressure relief zone is a through hole.

15. The battery according to claim 1, wherein the thermal management component comprises a groove arranged opposite to the pressure relief mechanism, a bottom wall of the groove forms the pressure relief zone, and a thickness of the thermal management component at the bottom wall of the groove is smaller than a thickness of the thermal management component at another region other than the groove.

16. The battery according to claim 1, wherein a melting point of a material of the pressure relief zone is smaller than a melting point of a material of another region on the thermal management component other than the pressure relief zone.

17. A power consumption apparatus, comprising a battery, the battery being configured to provide electric energy for the power consumption apparatus, the battery comprising:
a battery cell comprising a pressure relief mechanism, the pressure relief mechanism being disposed on a first wall of the battery cell, and the pressure relief mechanism being configured to be actuated when an internal pressure or temperature of the battery cell reaches a threshold, to relieve the internal pressure; and
an electrical chamber configured to accommodate the battery cells;

a collection chamber configured to collect emissions from the battery cell when the pressure relief mechanism is actuated;

a thermal management component configured to isolate the electrical chamber from the collection chamber, and to accommodate a fluid to adjust a temperature of the battery cell, a first surface of the thermal management component being attached to the first wall, and the thermal management component being provided with a pressure relief zone, so that emissions discharged from an inside of the battery cell are capable of being discharged through the pressure relief zone to the collection chamber when the pressure relief mechanism is actuated;

wherein the first wall is provided with a first restraint member, the thermal management component is provided with a second restraint member, and the first restraint member and the second restraint member are arranged to be mated, so that the pressure relief mechanism is arranged opposite to the pressure relief zone.

18. The power consumption apparatus according to claim 17, wherein the first restraint member comprises a protrusion structure and the second restraint member comprises a groove structure, or the first restraint member comprises a groove structure and the second restraint member comprises a protrusion structure; and the protrusion structure is at least partially accommodated in the groove structure.

* * * * *